United States Patent Office 3,510,739
Patented May 5, 1970

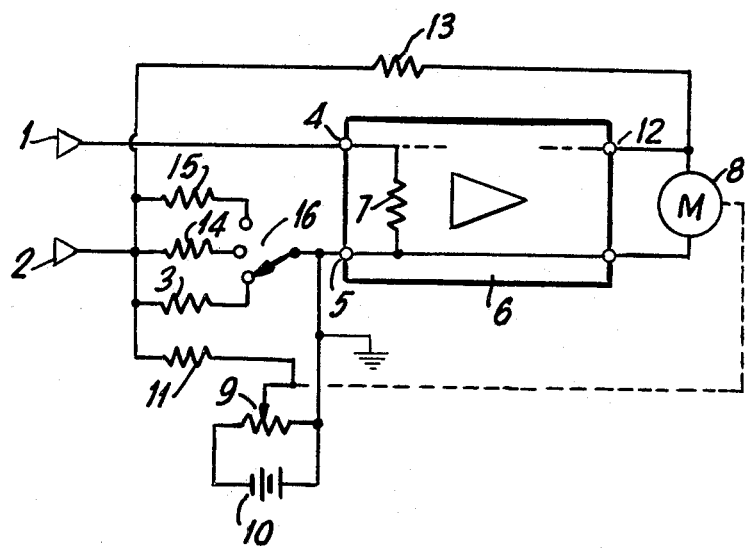

3,510,739
SELF-COMPENSATING SERVO SYSTEM
Berthus Petersen, Delft, Netherlands, assignor to N.V. v/h P. J. Kipp & Zonen, Delft, Netherlands
Filed Nov. 13, 1967, Ser. No. 682,446
Claims priority, application Netherlands, Nov. 17, 1966, 6616227
U.S. Cl. G05b 6/02
U.S. Cl. 318—18                                3 Claims

ABSTRACT OF THE DISCLOSURE

A self-compensating servo system has input terminals connected, through a compensating resistor, to the input of a servo amplifier driving a means to be adjusted, such as a servo motor. A servo amplifier has a grounded input terminal connected to one output terminal, the other input terminal and the other output terminal being ungrounded. One end of the compensating resistor is connected to the grounded input terminal of the amplifier, and the other end of the compensating resistor is connected through another resistor to the ungrounded output terminal of the amplifier. The servo motor is coupled with a reference circuit which applies a current, depending upon the position of the servo motor, to the compensating resistor so that the system reaches the steady state in a condition in which the voltage across the compensating resistor exactly compensates the voltage at the input terminals of the servo system. The amplifier is designed in such a manner that its output signal is in phase opposition with its input signal so that the strength of the voltage feedback obtained through the additional resistor and the compensating resistor varies inversely in accordance with the source resistance connected to the input terminals of the servo system.

SUMMARY OF THE INVENTION

The invention relates to a self-compensating servo system, the input of terminals of which, through a compensating resistor, are connected to the input of a servo amplifier which drives an adjusted means, which is coupled with a reference circuit which applies a current which is dependent upon the position of the adjusted means to the compensating resistor, whereby the system adjusts itself to a condition in which the voltage across the compensating resistor exactly compensates the voltage at the input of terminals of the servo system.

By virtue of the prescribed compensation, such a self-compensating servo system, when at rest, does not draw current from the voltage source which is connected to the input terminals of the servo system, so that the input resistance of the servo system may be regarded as infinite. The input resistance of the servo amplifier itself, however, is not infinite in general and may even have a rather low value, especially if use is made of a semiconductor component, such as transistor, in the input stage of the servo amplifier. If, starting from a steady state, a change occurs in the voltage which is provided at the input terminals of the servo system, the voltage across the compensating resistor initially retains its original value, so that it no longer compensates the changed input voltage. In that state, the effective input resistance of the servo system is no longer infinite, but only equals the input resistance of the servo amplifier itself, increased by the compensating resistor, which, however, is invariably much smaller than the input resistance of the servo amplifier. If the source resistance of the voltage source which is connected to the input terminals of the servo system is large as compared with the input resistance of the servo amplifier, only a small part of the change, which the E.M.F. of the voltage source at the input terminals underwent, remains at the input terminals of the servo amplifier, so that the response sensitivity of the servo system is low. A still more serious disadvantage is that the response sensitivity of the servo system is strongly dependent upon the source resistance of the voltage source which is connected to the input terminals of the servo system.

The invention aims at providing a servo system of the type referred to hereinabove, in which a constant response sensitivity within wide limits is obtained, also if the source resistance of the voltage source connected to the input terminals of the servo system is substantially greater than the input resistance of the servo amplifier itself.

For that purpose, a servo system according to the invention is characterized in that the compensating resistor has one end connected to the grounded input terminal of the amplifier, and its other end is connected through a resistor to the non-grounded output terminal of the amplifier, in which the amplifier is so designed that its output signal is in counterphase, or phase opposition; with its input signal, so that, through the resistor connected between the amplifier output and the compensating resistor, a voltage feedback is obtained, the strength of which varies inversely with the source resistance of the circuit connected to the input terminals of the system.

With a high value of the source resistance of the circuit connected to the input terminals of the servo system, a correspondingly weak feedback is obtained in the loop in which the servo amplifier is connected, so that the amplification of this loop is higher as the source resistance of the circuit at the input terminals of the servo system is higher. In that case, variations of the E.M.F. of the voltage source connected to the input terminals of the servo system cause smaller input voltages for the servo amplifier as the source resistance of the voltage source is higher, but these smaller input voltages for the servo amplifier are subjected to a correspondingly higher amplification, so that the response sensitivity of the servo system ultimately is substantially independent from the source resistance of the voltage source connected to the input terminals of the servo system.

It would be possible, per se, to render the response sensitivity of the servo system less dependent upon the source resistance of the voltage source by increasing the input resistance of the servo amplifier, e.g. by means of a voltage feedback independent of the range switching in the servo amplifier itself. In this way, it could be obtained, basically, that the effective input resistance of the servo amplifier is large as compared with the highest possible source resistance of the voltage source at the input of the servo system, in which case the value of the source resistance of this voltage source no longer would be of appreciable influence, but for that purpose an unusually heavy feedback would often be required in the servo amplifier.

The switching of the measuring range of the servo system can be effected by switching the compensating resistor. In a servo system according to the invention, the advantage is obtained, in that case, that, upon decreasing the measuring range by decreasing the compensating resistor, moreover the voltage feedback from the output of the servo amplifier to its input circuit is decreased, so that the amplification of the servo amplifier is increased and, consequently, in conjunction with the smaller voltages occurring in the input circuit of the servo amplifier, a constant response sensitivity is obtained. In known designs, for maintaining a constant response sensitivity, the switching of the compensating resistor must be accompanied by a switching of the amplification of the servo amplifier, e.g. by switching attenuating networks in the servo amplifier itself or in a feedback circuit in the servo amplifier. In a servo system according to the invention, the range switching can therefore be effected in a simpler way than in known designs.

The invention will be further elucidated below with reference to the drawing, which shows a circuit diagram of a servo system according to the invention.

In the figure, the input terminals 1 and 2 of the servo system, through a compensating resistor 3, are connected to the input terminals 4 and 5 of a servo amplifier 6 having an input resistance 7. A means 8 to be adjusted is connected to the output of the servo amplifier 6, and is shown as a servo motor coupled with a reference potentiometer 9 which is supplied from a reference voltage source 10. The reference voltage derived from the tap of the potentiometer 9 is applied through a resistor 11 to the compensating resistor 3, whereby the servo system reaches the steady state in a condition in which the potentiometer 9 is so adjusted that, through the resistor 11, it generates a voltage across the compensating resistor 3 which exactly compensates the voltage between the input terminals 1 and 2 of the servo system, in which case no voltage occurs between the input terminals 4 and 5 of the servo amplifier and the means 8 to be adjusted is no longer energized. The compensating resistor 3 is invariably small as compared with the input resistance 7 of the servo amplifier 6 and as compared with the resistor 11.

If the source resistance of the voltage source connected to the input terminals 1 and 2 of the servo system is large as compared with the input resistance 7 of the servo amplifier 6, the serve system, in steady state, forms no load for the input voltage source, but as long as the servo system has not yet reached the steady state, the input resistance 7 considerably loads the input voltage source, so that variations of the E.M.F. of the input voltage source manifest themselves only to a slight degree at the input terminals 4 and 5 of the servo amplifier 6, whereby the response sensitivity of the servo system is low. Moreover, this response sensitivity is strongly dependent upon the value of the source resistance of the input voltage source, as compared with the input resistance 7 of the servo amplifier 6.

For removing this disadvantage, a feedback resistor 13 is connected between the non-grounded output terminal 12 of the servo amplifier 6 and the input terminal 2 of the servo system. In order to obtain negative feedback, the servo amplifier 6 should be so designed that its output signal is in counterphase or phase opposition with its input signal. In that case, the feedback through the resistor 13 varies inversely with the source resistance of the voltage source at the input terminals 1 and 2 of the servo system, so that the effective amplification of the servo amplifier 6 is higher as the source resistance of the input voltage source at the input terminals 1 and 2 of the servo system is higher. Consequently, a constant response sensitivity is maintained over a very broad range of values of the source resistance of the voltage source at the input terminals 1 and 2.

The measuring range of the servo system can be changed by vibrations of the value of the compensating resistor in the input circuit. For that purpose, further compensating resistors 14 and 15, together with a commutator switch 16, are connected in the input circuit. By switching in a compensating resistor 14 with a lower resistance instead of the compensating resistor 3, the measuring range is decreased. This is accompanied by an attenuation of the feedback through the resistor 13, so that the effective amplification of the loop including the servo amplifier 6 is increased, in which case, notwithstanding the smaller voltages which occur in the input circuit of the servo amplifier 6 upon a decrease of the measuring range, a constant response sensitivity is maintaned. It is not necessary, for that purpose, to influence the amplification of the servo amplifier 6 by means of a separate commutator switch which is coupled with the commutator switch 16 for the compensating resistors 3, 14 and 15, as would be necessary for obtaining a constant response sensitivity in the usual servo systems.

What I claim is:

1. A self-compensating servo system, comprising, in combination, a pair of system input terminals for connection to a voltage source; a servo amplifier having a pair of amplifier input terminals, one of which is grounded and a pair of amplifier ouput terminals, one of which is grounded; a servo means to be adjusted connected to said amplifier output terminals for driving by said servo amplifier; compensator resistor means connected to said system input terminals and having one end connected to the grounded amplifier input terminal; a reference circuit coupled to said servo means and connected to said compensator resistor means, said reference circuit applying, to said compensator resistor means, a current depending upon the position of said servo means, whereby the system reaches the steady state in a condition in which the voltage across the compensator resistor means exactly compensates the voltage across said system input terminals; an additional resistor connected between the ungrounded amplifier output terminal and the other end of said compensator resistor means; said amplifier being designed so that its output signal is in phase opposition with its input signal, so that, through said additional resistor and said compensator resistor means, a voltage feedback is obtained whose strength varies inversely as the source resistance of the voltage source connected to said system input terminals.

2. A self-compensating servo system, as claimed in claim 1, in which said compensator resistor means is variable in resistance value whereby, by decreasing the resistance value of said compensator resistor means, there is obtained not only a decrease of the measuring range of said servo system but also a decrease of the feedback factor of the loop including said servo amplifier; whereby, the effective amplification of said loop is increased and the relative response sensitivity of said servo system remains constant.

3. A self-compensating servo system, as claimed in claim 2, in which said compensator resistor means comprises a plurality of compensator resistors connected in parallel to said system input terminals; and a commutator switch connected to said grounded amplifier input terminal and operable to connect a selected one of said compensator resistors to said grounded amplifier input terminal.

References Cited

UNITED STATES PATENTS

| 3,172,025 | 3/1965 | Jones et al. | 318—28 XR |
| 3,246,222 | 4/1966 | Ogawa et al. | 318—29 |
| 3,323,054 | 5/1967 | Yasui | 318—448 XR |
| 3,419,775 | 12/1968 | Kardos | 318—28 XR |

BENJAMIN DOBECK, Primary Examiner

U.S. Cl. X.R.

318—28